Feb. 13, 1923. 1,445,399.
F. M. KILFOYLE.
HEADLIGHT DEFLECTOR.
FILED JAN. 21, 1920.
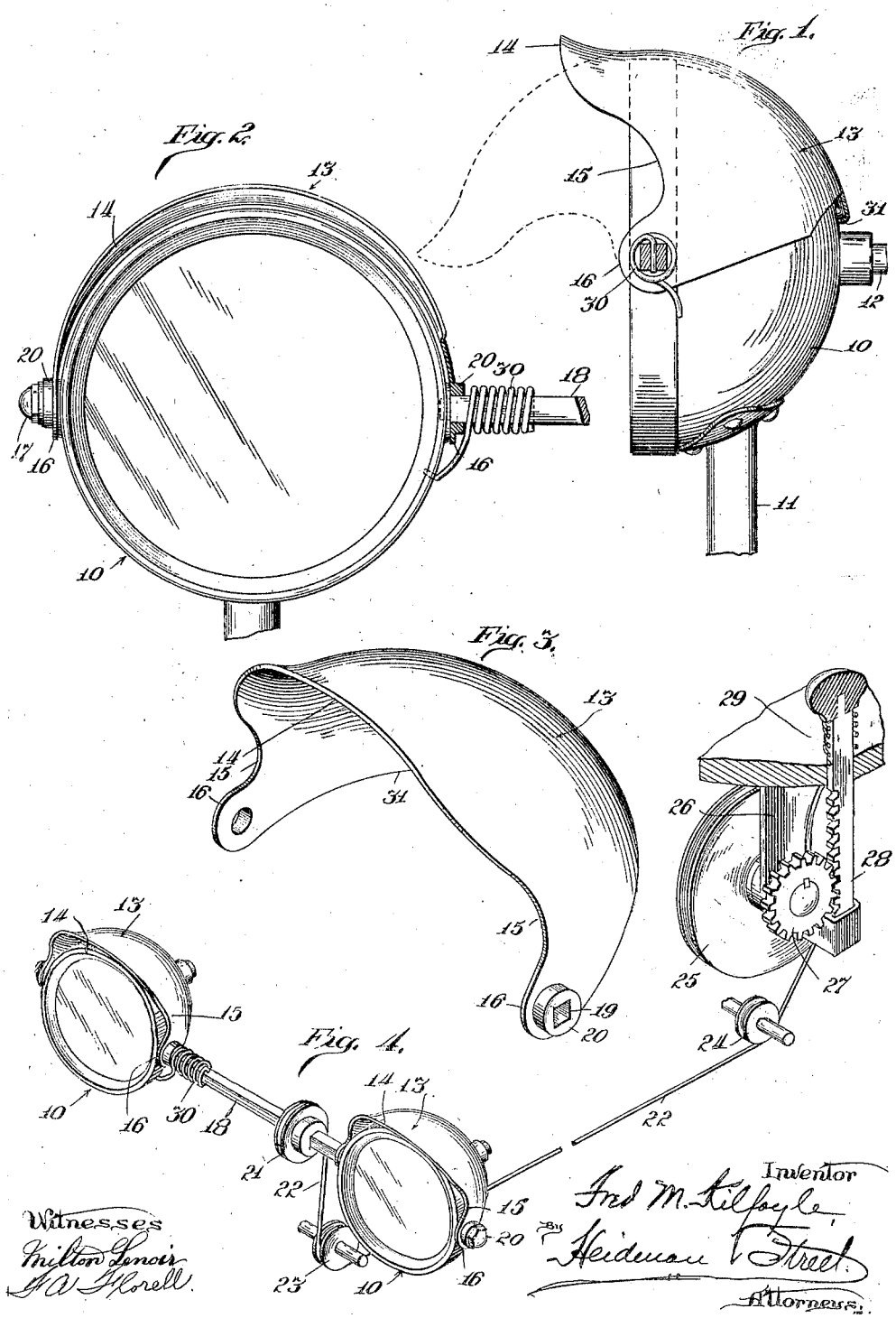

Patented Feb. 13, 1923.

1,445,399

UNITED STATES PATENT OFFICE.

FRED M. KILFOYLE, OF STORRS, UTAH.

HEADLIGHT DEFLECTOR.

Application filed January 21, 1920. Serial No. 353,016.

*To all whom it may concern:*

Be it known that I, FRED M. KILFOYLE, a citizen of the United States, and a resident of Storrs, in the county of Carbon and State of Utah, have invented certain new and useful Improvements in Headlight Deflectors, of which the following is a description, reference being had to the accompanying drawing, which forms a part of my specification.

My invention relates to a deflector more especially intended for use on automobile headlights, and has for its object the provision of a construction whereby means, operable from the seat of the driver or operator, may be readily adjusted, at the will of the operator, so as to deflect or shut off the rays of light in a direct forward direction, as for example upon the approach of an oppositely traveling automobile or other vehicle; the construction at the same time being of such nature that the light itself or lighting medium need not be altered but may continue at full normal power and the rays of light deflected in such manner as to light up the area or portion of the highway immediately forward of the automobile as well as to both forward sides thereof, thus enabling the operator or driver to see the condition of the road being traveled without, however, having the rays of light extend in forwardly and upwardly diverging lines where they will encounter or provide a glare for the eyes of the driver of an approaching or oppositely directed machine.

One object of my invention is to so construct the deflectors on both headlights, disposed on opposite sides of the automobile, or other vehicle, that both deflectors by the use of suitable means may be simultaneously and readily operated by the driver at the seat of the operator or driver; the deflectors being so secured to the headlights that they may be readily adjusted or positioned at the will of the operator and at the same time be held against undue movement and any undesirable rattle.

The objects and advantages of my improved construction will be more readily comprehended from the detailed description of the accompanying drawing, wherein:—

Figure 1 is a side elevation of an automobile type of headlight provided with my improved deflector; the connecting means with the deflector of the lamp on the opposite side of the machine being shown in section.

Figure 2 is a front elevation thereof.

Figure 3 is a perspective view of the deflector.

Figure 4 is a more or less diagrammatic view of my invention, in perspective, illustrating my invention applied to two parallelly arranged headlights and disclosing a method or one form of means whereby the deflectors of both headlights are similarly and simultaneously operated at a distance removed therefrom.

In the particular exemplification of the invention, as shown in the drawing, the lamp 10 may be of the usual electrically lighted headlight, generally more or less semi-spherical in construction and supported by a suitable bracket or standard 11 on the shields or mud-guards, or other portion of the automobile-frame, at the forward end of the automobile; with one lamp arranged adjacent each forward side in the usual manner. The lamp 10 is shown provided with the usual socket or conduit connection at 12 whereby the current is conveyed to the lamp, per se.

The lamp 10 is provided with a hood or deflector 13, shown sector-shape in cross-section, that is substantially a quarter of a sphere, and preferably of a shape somewhat approximating that of a helmet, with the forward edge thereof preferably projecting beyond the sides so as to provide the portion or visor 14, which may be given a slight upward curve, as in Figure 1. The opposite sides at the forward end thereof are preferably somewhat cut away as at 15 for the passage of the light rays when the deflector or hood is swung forward of the lamp proper into the position indicated in dotted lines in Figure 1. By cutting away the sides of the deflector or hood, as shown at 15, the extensions or lobes 16 are provided whereby the deflector is pivotally secured on opposite sides of the frame or shell of the lamp 10; the one side being pivotally secured by any suitable means, as for example, a set-screw 17 with a suitable washer so as to permit oscillatory movement of the deflector without imparting such movement or rotation to the pivot member or screw 17. The opposite side of the deflector or hood is secured to the lamp-housing or frame by means of a connecting rod 18, which may be provided with a reduced end adapted to extend into a suitable aperture in the lamp-housing 10; while the rod, at least adjacent the reduced end, is preferably made rectangular in cross-section so as to fit into a rectangular aperture 19 formed in the adjacent lobe 16, of the hood or deflector, see Figure 3. In order to provide suitable purchase for the respective pivotal members and the rod, I prefer to provide the lobes 16 of the deflector or hood 13 with the apertured bosses as shown at 20, 20 in Figures 2 and 3. With the squared end of the connecting rod 18 seated in the square aperture 19 of the opposite sides of both deflectors or hoods, it is apparent that the two deflectors will be caused to oscillate in unison when the rod 18 is rocked. The inner sides of the hoods or deflectors 13 may, when desired, be formed or provided with suitable reflecting surfaces.

Any suitable means for operating the deflectors may be provided; as for example, the connecting-rod 18 is shown in Figure 4 provided with a pulley 21 to which a suitable cord or wire 22 is secured, which may then be passed about a pulley 23, supported in any suitable manner to the frame of the automobile or vehicle. The cord or wire 22, passing about pulley 23, is then made to pass rearwardly about a suitable wheel or pulley 24 secured in any manner at a point beneath the seat of the driver or operator or at a point beneath the floor of the automobile in proximity to the seat.

After passing about the pulley 24, the cord or wire 22 has its end secured to a large pulley or wheel 25 rotatably mounted in a suitable bracket, as at 26, beneath the floor or adjacent the seat, as desired; the cord or wire being secured so as to wind about pulley 25 when the latter is rotated in one direction. Secured to the pulley 25, or to the journal of the pulley, I show a pinion 27 with which a rack-bar or rod 28 meshes. The rack-bar or rod 28 may either be hand or foot operated; being placed within easy reach of the hand or foot of the operator.

The rack-bar or rod 28 is suitably mounted so as to be maintained in mesh with the pinion 27 and is also preferably shown provided with a coil spring 29 of such strength and tension as to normally maintain the rack-bar or rod in elevated position through the floor of the automobile or seat of the operator and therefore also tend to rotate pinion 27 and with it pulley 25 so as to wind up cord or wire 22 on the pulley 25 and therefore, by reason of the direction of passage of cord or wire 22 about pulley 21, cause the connecting rod 18 to be rotated in such direction as to elevate the hoods or deflectors 13, 13 above the headlights 10, 10. That is to say, the tension of spring 29 is such that it will tend to place the various elements in normal position, which means that the deflectors or hoods 13 will be in position where they will not interfere with the forwardly diverging rays of light from the headlights.

The connecting rod 18 is preferably shown provided with a coil spring 30, one end whereof may be secured to the frame of the headlight, or any other stationary element, while the opposite end is secured preferably to the connecting-rod 18 and the spring so placed on the connecting rod that it will exert its tension in a twisting manner to the connecting-rod in a direction which tends to lower or rather move the hoods or deflectors 13, 13 forwardly, and in front of the headlights or lamps. With this arrangement, it is evident that the spring 30 will rock shaft or connecting-rod 18 as soon as the rack-bar 28 is depressed against the action of its spring 29, thereby rotating pulley 25 in a direction which will give slack to the cord or wire 22 and which will therefore permit spring 30 to come into play and cause the deflectors or hoods 13 to be moved forward of the headlights into the position shown in dotted lines in Figure 1; provided, of course, that the rack-bar 28 has been depressed to its maximum limit to induce the dotted line position of the deflector or hood 13 in Figure 1 and which is preferably the maximum forward position thereof. At the same time the spring 30 will maintain the connecting-rod 18, and therefore with it both hoods or deflectors 13 under sufficient tension to prevent any possible rattle or vibration of the deflectors when the latter are in their normal or inoperative positions. The rear edge of the deflectors may also be beaded or provided with an inturned edge, as shown at 31 in Figure 1, adapted to engage with the rim at the forward end of the headlight frame or housing as indicated in dotted lines, Figure 1, thus preventing the too far movement of the deflectors.

The various elements are so correlated that but slight movement of rack-bar 28 will be necessary to operate the hoods or deflectors to bring them into the maximum lowered position; and the coil spring 29 may be of a tension greater than that of spring 30 so that spring 29 will induce the elements to operate as just stated; that is to say, spring 29 is intended to overcome the tension of spring 30 immediately upon release of rack-bar 28, causing the return of the hoods or deflectors 13 to normal position, as indicated in full lines in Figure 1.

The advantages of my invention will be readily apparent; for example, the operator or driver, at will, may direct the light from his headlights to an area immediately in front of the automobile without the necessity of cutting down the light as is the usual practice; and with the cut-out portions 15 the light is also deflected toward both sides, forwardly of the automobile; while at the same time the glare of the headlights will not be encountered by an oppositely traveling and approaching automobile. The hoods or deflectors may be swung forward to any degree commensurate with the desires of the driver, whereby a lighted area may be provided, ensuring proper protection or safety for the driver or operator.

It is apparent that the operator may move the hoods or deflectors forward of the headlights any desired degree and still obtain a brightly lighted area, to a considerable extent, forward of his automobile or vehicle; the invention thus obviating the necessity for dimming the headlights, as at present employed, in accordance with the laws or ordinances of a good many localities; which practice gives the operator or driver an inadequately lighted area forward of his automobile; such lighting frequently being insufficient for the driver or operator to discern obstructions or improperly constructed roadways direct in his path.

The advantages of my improved construction are readily apparent and it is also evident that various means may be provided for operating the headlights, differing in certain respects from the exemplification disclosed in the drawing, without, departing from the spirit of my invention.

What I claim is:—

In combination with the headlights of an automobile, a single piece segmental hood disposed about the top of each headlight, each hood being provided with apertured lobes or extensions at both sides, one side of each hood being pivotally connected to one side of its respective headlight, the sides of each hood being cut away to permit passage of the light-rays toward both sides thereof, a connecting rod on which the other side of each hood is non-rotatably mounted, the ends of said rod being rotatably mounted in the adjacent sides of the headlights, whereby all of said hoods are made to move in unison when said rod is rotated, resilient means secured to said rod and to the headlights whereby the rod is rotated back to normal position and the hoods held against vibration, and means operable from the seat of the operator and flexibly connected with said connecting rod, whereby the latter may be rotated against the action of the resilient means and the hoods simultaneously swung forwardly.

FRED M. KILFOYLE.

Witnesses:
W. E. COWLEY,
WILL F. WALRAICN.